United States Patent
Yang et al.

(10) Patent No.: US 10,394,723 B2
(45) Date of Patent: Aug. 27, 2019

(54) DATA ACCESSING METHOD AND PCIE STORAGE DEVICE

(71) Applicants: BEIJING LENOVO SOFTWARE LTD., Beijing (CN); LENOVO (BEIJING) LIMITED, Beijing (CN)

(72) Inventors: Bibo Yang, Beijing (CN); Xingzhong Mao, Beijing (CN); Haiyang Wang, Beijing (CN); Anrong Yang, Beijing (CN)

(73) Assignees: BEIJING LENOVO SOFTWARE LTD, Beijing (CN); LENOVO (BEIJING) LIMITED, Beijing (CN)

( * ) Notice: Subject to any disclaimer, the term of this patent is extended or adjusted under 35 U.S.C. 154(b) by 233 days.

(21) Appl. No.: 14/849,213

(22) Filed: Sep. 9, 2015

(65) Prior Publication Data

US 2016/0364346 A1    Dec. 15, 2016

(30) Foreign Application Priority Data

Jun. 12, 2015    (CN) .......................... 2015 1 0325194

(51) Int. Cl.
| | |
|---|---|
| *G06F 13/16* | (2006.01) |
| *G06F 13/10* | (2006.01) |
| *G06F 13/28* | (2006.01) |
| *G06F 13/42* | (2006.01) |
| *G06F 3/00* | (2006.01) |
| *G06F 13/38* | (2006.01) |

(52) U.S. Cl.
CPC ........ *G06F 13/1668* (2013.01); *G06F 13/102* (2013.01); *G06F 13/28* (2013.01); *G06F 13/4282* (2013.01)

(58) Field of Classification Search
None
See application file for complete search history.

(56) References Cited

U.S. PATENT DOCUMENTS

2013/0268694 A1* 10/2013 Campbell ............... G06F 13/20
  710/8
2014/0047166 A1*  2/2014 Asnaashari ......... G06F 12/0246
  711/103

* cited by examiner

*Primary Examiner* — Scott C Sun (57) ABSTRACT

The present disclosure provides a data accessing method applied to a PCIe storage device. The method comprises: receiving a data reading/writing request sent by a host; calculating a physical storage location of data to be accessed, based on the data reading/writing request, wherein the physical storage location comprises a plurality of PCIe storage devices communicating according to a network protocol; acquiring the data from the plurality of PCIe storage devices based on the network protocol and transferring the data to the host. Also, the disclosure provides a PCIe storage device. With the solution of the disclosure, a PCIe storage device is enabled to access both local and cloud storages, the small-capacity problem with the local storage is addressed and operations of a host's operating system for managing two different types of heterogeneous storages are simplified.

10 Claims, 5 Drawing Sheets

DATA ACCESSING METHOD AND PCIE STORAGE DEVICE

CROSS-REFERENCE TO RELATED APPLICATION(S)

This application claims priority to the Chinese Patent Application No. 201510325194.7, filed on Jun. 12, 2015, entitled "DATA ACCESSING METHOD AND PCIe STORAGE DEVICE", which is incorporated herein by reference in its entirety.

TECHNICAL FIELD

The present disclosure relates to the technical field of computer storage, and more particularly, to data accessing methods and PCIe storage devices.

BACKGROUND

With the rapid development of Internet and cloud computing technology, information technology enters an era of big data. The amount of data to be processed in various industries and fields increases dramatically. Users require storage servers which serve as data nodes to have high reliability for data protection and high availability for data reading/writing.

Peripheral Component Interconnect Express (PCIe) is a standard for buses and interfaces. A PCIe bus is a point-to-point serial connection approach for connecting devices, and handles communications in a point-to-point manner. Each device establishes its own transmission channel when data needs to be transmitted. The transmission channel is closed to other devices. As such, exclusiveness of the channel is ensured, and interference from other devices is avoided. The most profound significance of the PCIe bus lies in its versatility, which enables it to be used not only for connecting a southbridge with other devices but also for connecting chip sets and even for connecting graphic chips. In this way, the entire Input/Output (I/O) system will be reunified, computer systems will be further simplified, and transportability and modularity of computers will be improved.

However, as one kind of PCIe products, most of the existing PCIe storage cards are dedicatedly used for either local storage or network storage, but do not support both local storage and network storage.

SUMMARY

In an aspect of the disclosure, there is provided a data accessing method applied to a PCIe storage device. The method comprises:

receiving an NVMe protocol data reading/writing request sent by a host;

calculating a physical storage location of data to be accessed, based on the data reading/writing request, wherein the physical storage location comprises a plurality of PCIe storage devices communicating according to a network protocol;

acquiring the data from the plurality of PCIe storage devices based on the network protocol, and transferring the data to the host.

In the above described solution, preferably, the plurality of PCIe storage devices can communicate directly and share the same storage resources.

In the above described solution, preferably, the method further comprises: before receiving the data reading/writing request sent by the host, logically mapping hard disk storage space to a storage device, such that a uniform hard disk file operation interface is presented on an operating system of the host.

In the above described solution, preferably, said acquiring the data from the plurality of PCIe storage devices based on the network protocol and transferring the data to the host comprises:

when the physical storage location of the data to be accessed is a cloud storage server, transmitting a network storage protocol request to the cloud storage server;

transferring data returned by the cloud storage server to a dynamic random access memory (DRAM) of the host.

In the above described solution, preferably, said transmitting the network storage protocol request to the cloud storage server comprises: transmitting the network storage protocol request to the cloud storage server through an external network interface card;

and said transferring the data returned by the cloud storage server to the DRAM of the host comprises: configuring a Direct Memory Access (DMA) controller in the network interface card to transfer the data returned by the cloud storage server to the DRAM of the host, or said transmitting the network storage protocol request to the cloud storage server comprises: transmitting the network storage protocol request to the cloud storage server through an network interface card integrated in the PCIe storage device; and said transferring the data returned by the cloud storage server to the DRAM of the host comprises: configuring a DMA controller in the PCIe storage device to transfer the data returned by the cloud storage server to the DRAM of the host.

In the above described solution, preferably, said acquiring the data from the plurality of PCIe storage devices based on the network protocol and transferring the data to the host further comprises:

when the data to be accessed is stored in a distributed cache of a private cloud server, acquiring the data to be accessed by accessing storage resources on other hosts, which have PCIe storage devices arranged thereon, based on a point-to-point data transport protocol instead of accessing the private cloud server.

In the above described solution, preferably, said acquiring the data from the plurality of PCIe storage devices based on the network protocol and transferring the data to the host further comprises:

when the physical storage location of the data to be accessed is a local storage, transmitting to the host a response to a PCIe-based storage protocol data command;

transferring the data to be accessed in the local storage to a DRAM in the host.

In another aspect of the disclosure, there is provided a PCIe storage device. The PCIe storage device comprises:

a bus interface configured to receive an NVMe protocol data reading/writing request sent by a host;

a first controller configured to calculate a physical storage location of data to be accessed, based on the data reading/writing request, wherein the physical storage location comprises a plurality of PCIe storage devices communicating according to a network protocol;

a second controller configured to acquire the data from the plurality of PCIe storage devices based on the network protocol and transfer the data to the host.

In the above described solution, preferably, the plurality of PCIe storage devices can communicate directly and share the same storage resources.

In the above described solution, preferably, the PCIe storage device further comprises:

a mapping driver configured to logically map hard disk storage space to a storage device, such that a uniform hard disk file operation interface is provided on an operating system of the host.

In the above described solution, preferably, the second controller comprises:

a network storage controller configured to transmit a network storage protocol request to a cloud storage server when the physical storage location of the data to be accessed is a cloud storage server and to transfer data returned by the cloud storage server to a DRAM of the host.

In the above described solution, preferably, the network storage controller is further configured to:

transmit the network storage protocol request to the cloud storage server through an external network interface card, and configure a DMA controller in the network interface card to transfer the data returned by the cloud storage server to the DRAM of the host, wherein the network interface card is connected to the PCIe storage device, or transmit the network storage protocol request to the cloud storage server through a network interface card integrated in the PCIe storage device, and configure a DMA controller in the PCIe storage device to transfer the data returned by the cloud storage server to the DRAM of the host.

In the above described scheme, preferably, the network storage controller is further configured to:

when the data to be accessed is stored in a distributed cache of a private cloud server, acquire the data to be accessed by accessing storage resources on other hosts, which have PCIe storage devices arranged thereon, based on a point-to-point data transport protocol instead of accessing the private cloud server.

In the above described solution, preferably, the second controller further comprises:

an NVMe controller configured to transmit to the host a response to a PCIe-based storage protocol data command when the physical storage location of the data to be accessed is a local storage and to transfer the data to be accessed in the local storage to a DRAM of the host.

DETAILED DESCRIPTION OF THE EMBODIMENTS

In order to facilitate better understanding of features and technical contents of the disclosure, implementations of the disclosure will be described in detail in conjunction with accompanying drawings, which are given for the purpose of illustration rather than limitation.

First Embodiment

Figure 1:
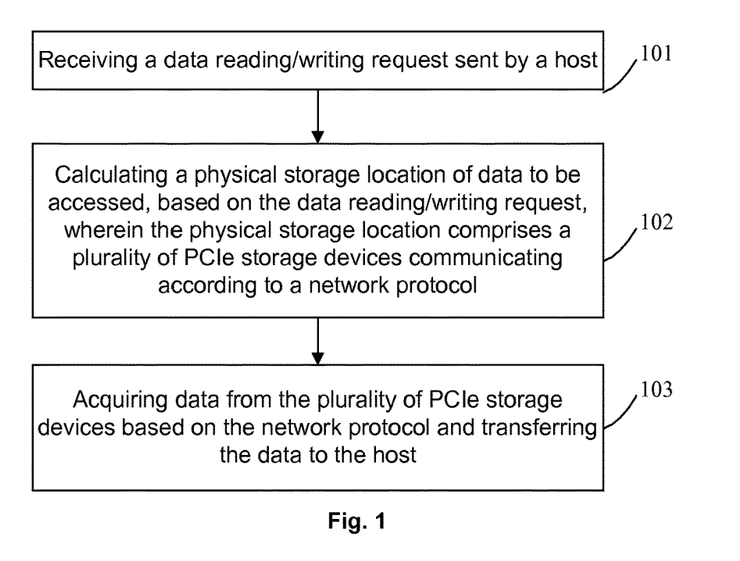
FIG. 1 is a first flowchart of a data accessing method according to an embodiment of the disclosure.

FIG. 1 is a first flowchart of a data accessing method applied to a PCIe storage device according to the embodiment of the disclosure. In a preferred embodiment of the disclosure, the data accessing method comprises the following steps.

At step 101, a data reading/writing request sent by a host is received.

Preferably, an NVMe protocol data reading/writing request sent by the host is received.

In the embodiment, the plurality of PCIe storage devices may communicate directly and share uniform storage resources.

In the embodiment, the PCIe storage device may logically map hard disk storage space to a storage device, such that a uniform hard disk file operation interface is presented on an operating system of the host.

At step 102, a physical storage location of data to be accessed is calculated based on the data reading/writing request. The physical storage location comprises a plurality of PCIe storage devices communicating according to a network protocol.

Here, the physical storage location comprises:

a local storage and a cloud storage server, wherein the cloud storage server includes a public cloud server and a private cloud server.

Specifically, the local storage can be construed as a storage within the PCIe storage device.

At step 103, the data is acquired from the plurality of PCIe storage devices based on the network protocol and transferred to the host.

Preferably, acquiring the data from the plurality of PCIe storage devices based on the network protocol and transferring the data to the host may comprise:

when the physical storage location of the data to be accessed is the cloud storage server, transmitting a network storage protocol request to the cloud storage server;

transferring data returned by the cloud storage server to a DRAM of the host.

Specifically, transmitting the network storage protocol request to the cloud storage server may comprise:

transmitting the network storage protocol request to the cloud storage server through an external network interface card, or transmitting the network storage protocol request to the cloud storage server through an network interface card integrated in the PCIe storage device.

Accordingly, when the network storage protocol request is transmitted to the cloud storage server through the external network interface card, transferring the data returned by the cloud storage server to the DRAM of the host comprises:

configuring a DMA controller in the PCIe storage device to transfer the data returned by the cloud storage server to the DRAM of the host.

When the network storage protocol request is transmitted to the cloud storage server through the network interface card integrated in the PCIe storage device, transferring the data returned by the cloud storage server to the DRAM of the host comprises: configuring a DMA controller in the PCIe storage device to transfer the data returned by the cloud storage server to the DRAM of the host.

Preferably, acquiring the data from the plurality of PCIe storage devices based on the network protocol and transferring the data to the host may further comprise:

when the data to be accessed is stored in a distributed cache of the private cloud server, acquiring the data to be accessed by accessing storage resources on other hosts, which have PCIe storage devices arranged thereon, based on a point-to-point data transport protocol instead of accessing the private cloud server.

Preferably, acquiring the data from the plurality of PCIe storage devices based on the network protocol and transferring the data to the host may further comprise:

when the physical storage location of the data to be accessed is a local storage, transmitting to the host a response to a PCIe-based storage protocol command;

transferring the data to be accessed in the local storage to a DRAM in the host.

In the embodiment, the PCIe storage device may be a PCIe storage card.

The PCIe-based storage protocol may be a Non-Volatile Memory express (NVMe) storage protocol.

In the embodiment of the disclosure, an NVMe protocol data reading/writing request sent by a host is received; a physical storage location of data to be accessed is calculated, based on the data reading/writing request, wherein the physical storage location comprises a plurality of PCIe storage devices communicating according to a network protocol; the data is acquired from the plurality of PCIe storage devices based on the network protocol and transferred to the host. In this manner, local storage and cloud storage are unified, the speed of accessing the cloud storage is increased, the small-capacity problem with the local storage is addressed, operations of the host's operating system for managing two different types of heterogeneous storages are simplified, and user experience is improved.

Second Embodiment

Figure 2:
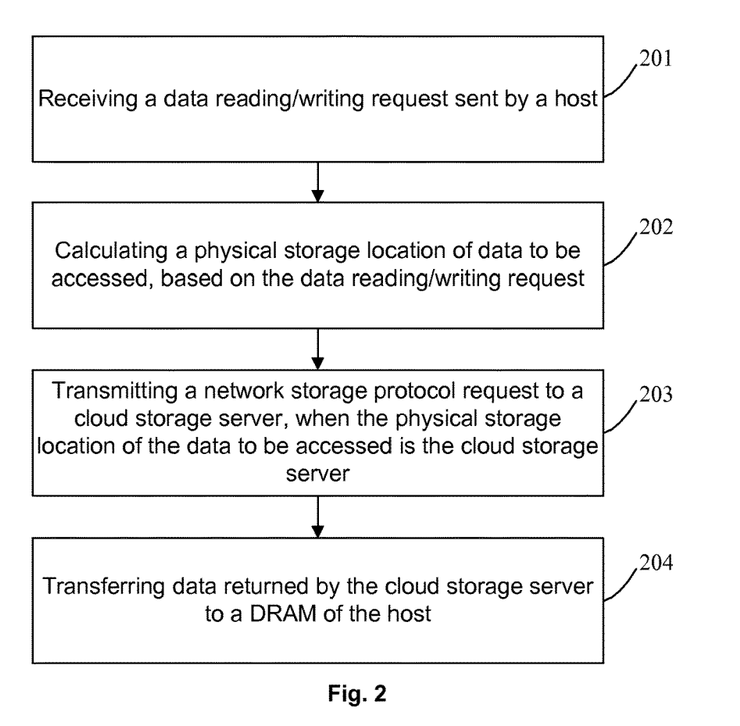
FIG. 2 is a second flowchart of a data accessing method according to an embodiment of the disclosure.

FIG. 2 is a second flowchart of a data accessing method applied to a PCIe storage device according to the embodiment of the disclosure. In a preferred embodiment of the disclosure, the data accessing method comprises the following steps.

At step 201, a data reading/writing request sent by a host is received.

Preferably, an NVMe protocol data reading/writing request sent by the host is received.

In the embodiment, the plurality of PCIe storage devices may communicate directly and share the same storage resources.

In the embodiment, the PCIe storage device may logically map hard disk storage space to a storage device, such that a uniform hard disk file operation interface is presented on an operating system of the host.

At step 202, a physical storage location of data to be accessed is calculated based on the data reading/writing request.

Here, the physical storage location comprises:

a local storage and a cloud storage server, wherein the cloud storage server includes a public cloud server and a private cloud server.

Specifically, the local storage can be construed as a storage within the PCIe storage device.

At step 203, a network storage protocol request is transmitted to the cloud storage server, when the physical storage location of the data to be accessed is a cloud storage server.

Specifically, transmitting the network storage protocol request to the cloud storage server may comprise:

transmitting the network storage protocol request to the cloud storage server through an external network interface card; or transmitting the network storage protocol request to the cloud storage server through an network interface card integrated in the PCIe storage device.

Accordingly, when the network storage protocol request is transmitted to the cloud storage server through the external network interface card, transferring data returned by the cloud storage server to the DRAM of the host comprises: configuring a DMA controller in the network interface card to transfer the data returned by the cloud storage server to a DRAM of the host.

When the network storage protocol request is transmitted to the cloud storage server through the network interface card integrated in the PCIe storage device, transferring the data returned by the cloud storage server to the DRAM of the host comprises: configuring a DMA controller in the PCIe storage device to transfer the data returned by the cloud storage server to the DRAM of the host.

At step 204, the data returned by the cloud storage server is transferred to the DRAM of the host.

Here, the cloud storage server in Step 203 and Step 204 mainly refers to a public cloud server.

In the embodiment, the PCIe storage device may be a PCIe storage card.

In the embodiment of the disclosure, a data reading/writing request sent by a host is received; a physical storage location of data to be accessed is calculated based on the data reading/writing request; a network storage protocol request is transmitted to the cloud storage server, when the physical storage location of the data to be accessed is the cloud storage server; data returned by the cloud storage server is transferred to a DRAM of the host. In this way, data stored in the cloud server can be accessed or data can stored in the cloud server through a uniform hard disk file operation interface. Thus, the small-capacity problem with the local storage is addressed, operations of a host's operating system for managing two different types of heterogeneous storages are simplified, and user experience is improved.

Third Embodiment

Figure 3:
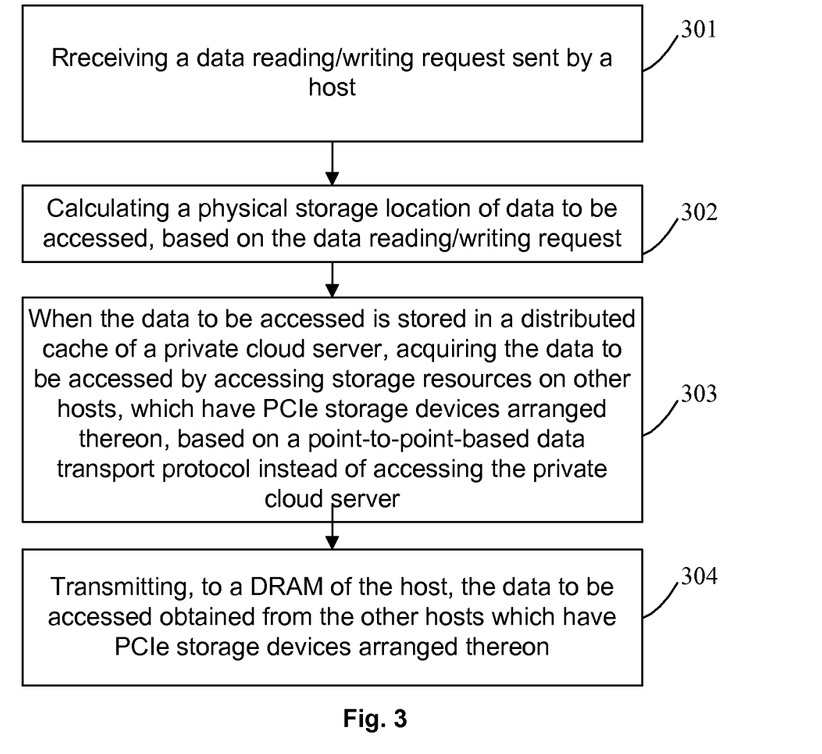
FIG. 3 is a third flowchart of a data accessing method according to an embodiment of the disclosure.

FIG. 3 is a third flowchart of a data accessing method applied to a PCIe storage device according to the embodiment of the disclosure. In a preferred embodiment of the disclosure, the data accessing method comprises following steps.

At step 301, a data reading/writing request sent by a host is received.

Preferably, an NVMe protocol data reading/writing request sent by the host is received.

In the embodiment, the plurality of PCIe storage devices may communicate directly and share the same storage resources.

In the embodiment, the PCIe storage device may logically map hard disk storage space to a storage device, such that a uniform hard disk file operation interface is presented on an operating system of the host.

At step 302, a physical storage location of data to be accessed is calculated based on the data reading/writing request.

Here, the physical storage location comprises:

a local storage and a cloud storage server, wherein the cloud storage server includes a public cloud server and a private cloud server.

Specifically, the local storage can be construed as a storage within the PCIe storage device.

At step 303, when the data to be accessed is stored in a distributed cache of the private cloud server, the data to be accessed is accessed by accessing storage resources on other hosts, which have PCIe storage devices arranged thereon, based on a point-to-point data transport protocol instead of accessing the private cloud server.

Specifically, when the data to be accessed is stored in the distributed cache of the private cloud server, the network storage protocol initiated by the PCIe storage device does not access the private cloud server. Instead, it obtains the data by accessing storage resources on other hosts. In this way, load on the private cloud server is reduced, and the speed of accessing shared resources is increased.

At step 304, the data to be accessed obtained from other hosts, which have PCIe storage devices arranged thereon, is transferred to a DRAM of the host.

In the embodiment of the disclosure, a data reading/writing request sent by a host is received; a physical storage location of data to be accessed is calculated based on the data reading/writing request; when the data to be accessed is stored in a distributed cache of a private cloud server, the data to be accessed is acquired by accessing storage resources on other hosts which have PCIe storage devices arranged thereon based on a point-to-point-based data transport protocol instead of accessing the private cloud server; and the data to be accessed obtained from the other hosts which have PCIe storage devices arranged thereon is transmitted to a DRAM of the host. As such, load on the private cloud server is reduced, the speed of accessing shared resources is increased, and user experience is improved.

Fourth Embodiment

Figure 4:
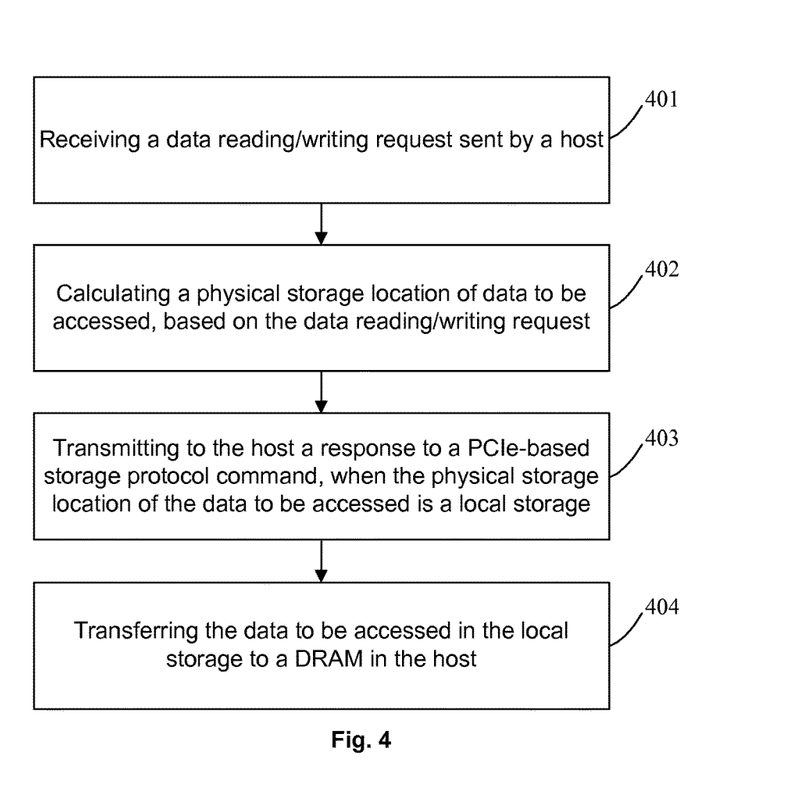
FIG. 4 is a fourth flowchart of a data accessing method according to an embodiment of the disclosure.

FIG. 4 is a fourth flowchart of a data accessing method applied to a PCIe storage device according to the embodiment of the disclosure. In a preferred embodiment of the disclosure, the data accessing method comprises following steps.

At Step 401, a data reading/writing request sent by a host is received.

Preferably, an NVMe protocol data reading/writing request sent by the host is received.

In the embodiment, the plurality of PCIe storage devices may communicate directly and share the same storage resources.

In the embodiment, the PCIe storage device may logically map hard disk storage space to a storage device, such that a uniform hard disk file operation interface is presented on an operating system of the host.

At Step 402, a physical storage location of data to be accessed is calculated based on the data reading/writing request.

Here, the physical storage location comprises:

a local storage and a cloud storage server, wherein the cloud storage server includes a public cloud server and a private cloud server.

Specifically, the local storage can be construed as a storage within the PCIe storage device.

At Step 403, a response to a PCIe-based storage protocol command is transmitted to the host, when the physical storage location of the data to be accessed is the local storage.

The PCIe-based storage protocol may be an NVMe storage protocol.

At Step 404, the data to be accessed in the local storage is transferred to a DRAM in the host.

In the embodiment of the disclosure, a data reading/writing request sent by a host is received; a physical storage location of data to be accessed is calculated based on the data reading/writing request; a response to a PCIe-based storage protocol command is transmitted to the host, when the physical storage location of the data to be accessed is a local storage; and the data to be accessed in the local storage is transferred to a DRAM in the host. As such, by storing frequently accessed data in the local storage of the PCIe storage device, the data to be accessed can be promptly returned to the host and user experience is improved.

Fifth Embodiment

Figure 5:
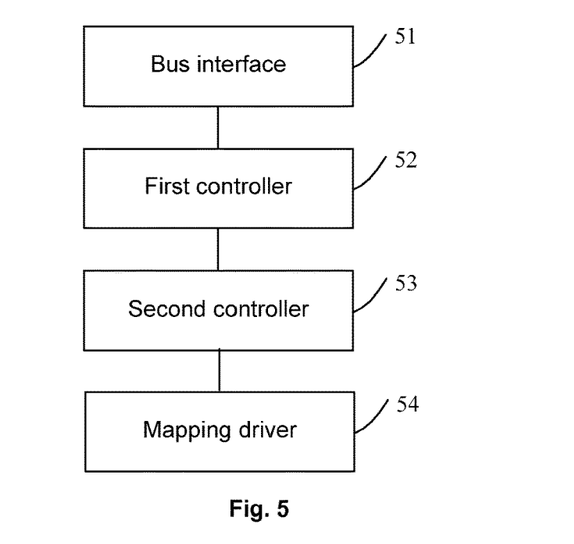
FIG. 5 is a first structural diagram of a PCIe storage device according to an embodiment of the disclosure.

FIG. 5 is a first structural diagram of a PCIe storage device according to the embodiment of the disclosure. As shown in FIG. 5, the PCIe storage device comprises:

a bus interface 51 configured to receive a data reading/writing request sent by a host, wherein the bus may be a PCIe bus;

a first controller 52 configured to calculate a physical storage location of data to be accessed based on the data reading/writing request, wherein the physical storage location comprises a plurality of PCIe storage devices which can communicate according to a network protocol;

a second controller 53 configured to acquire the data from the plurality of PCIe storage devices based on the network protocol and transfer the data to the host.

Preferably, the bus interface 51 is configured to receive an NVMe protocol data reading/writing request sent by the host.

In the above described solution, the plurality of PCIe storage devices can communicate directly and share the same storage resources.

Preferably, the PCIe storage device further comprises:

a mapping driver 54 configured to logically map hard disk storage space to a storage device, such that a uniform hard disk file operation interface is provided on an operating system of the host.

Here, the mapping driver 54 may be a DRAM.

Sixth Embodiment

Figure 6:
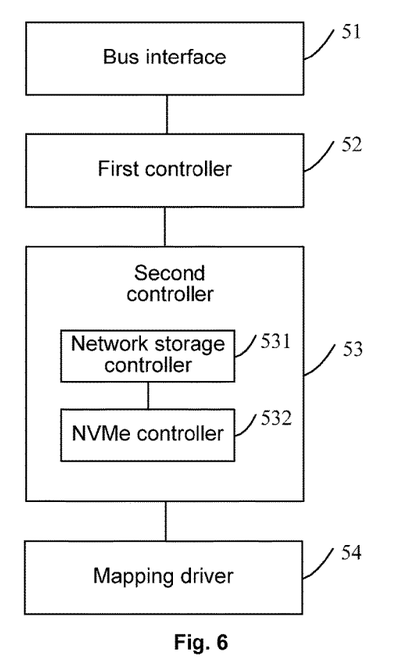
FIG. 6 is a second structural diagram of a PCIe storage device according to an embodiment of the disclosure.

FIG. 6 is a second structural diagram of a PCIe storage device according to an embodiment of the disclosure. As shown in FIG. 6, the PCIe storage device comprises:

a bus interface 51 configured to receive a data reading/writing request sent by a host, wherein the bus may be a PCIe bus;

a first controller 52 configured to calculate a physical storage location of data to be accessed based on the data reading/writing request, wherein the physical storage location comprises a plurality of PCIe storage devices which can communicate according to a network protocol;

a second controller 53 configured to acquire the data from the plurality of PCIe storage devices based on the network protocol and transfer the data to the host.

Preferably, the bus interface 51 is configured to receive an NVMe protocol data reading/writing request sent by the host.

In the above described solution, the plurality of PCIe storage devices can communicate directly and share the same storage resources.

Preferably, the PCIe storage device further comprises:

a mapping driver 54 configured to logically map hard disk storage space to a storage device, such that a uniform hard disk file operation interface is provided in an operating system of the host.

Preferably, the second controller 53 comprises:

a network storage controller 531 configured to transmit a network storage protocol request to a cloud storage server when the physical storage location of the data to be accessed is the cloud storage server and to transfer the data returned by the cloud storage server to a DRAM of the host.

Preferably, the network storage controller 531 is further configured to:

transmit the network storage protocol request to the cloud storage server through an external network interface card and configure a DMA controller in the network interface card to transfer the data returned by the cloud storage server to the DRAM of the host, wherein the network interface card is connected to the PCIe storage device, or transmit the network storage protocol request to the cloud storage server through a network interface card integrated in the PCIe storage device, and configure a DMA controller in the PCIe storage device to transfer the data returned by the cloud storage server to the DRAM of the host.

Preferably, the network storage controller 531 is further configured to:

when the data to be accessed is stored in a distributed cache of a private cloud server, acquire the data to be accessed by accessing storage resources on other hosts which have PCIe storage devices arranged thereon instead of accessing the private cloud server.

Preferably, the second controller 53 further comprises:

an NVMe controller 532 configured to transmit to the host a response to a PCIe-based storage protocol command when the physical storage location of the data to be accessed is a local storage and to transfer the data to be accessed in the local storage to a DRAM of the host.

The PCIe-based storage protocol may be an NVMe storage protocol.

Seventh Embodiment

Figure 7:
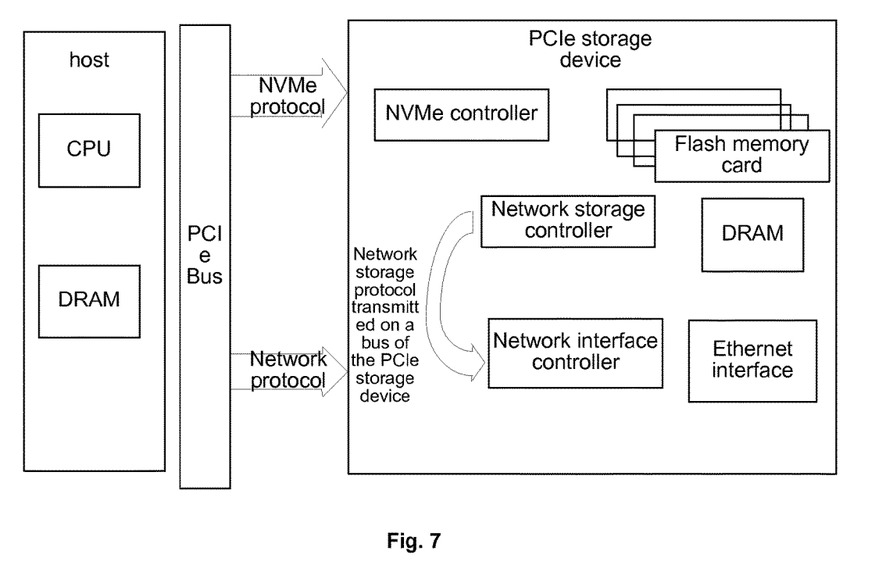
FIG. 7 is a first diagram of a hardware implementation of a PCIe storage device according to an embodiment of the disclosure.

FIG. 7 is a first diagram of a hardware implementation of a PCIe storage device according to the embodiment of the disclosure. The PCIe storage device has a network accessing function and a local storage function. As shown in FIG. 7, the PCIe storage device mainly comprises: an NVMe controller, a network storage controller, a plurality of Flash Memories, a DRAM, a network interface controller and an Ethernet interface. The Ethernet interface may be at a speed level of thousands/ten thousands of Mbps.

Specifically, the network interface controller and the Ethernet interface may constitute a network interface card.

The network accessing function of the PCIe storage device may be implemented in the following manner.

The network storage controller transmits a data access request to the network interface controller according to a network storage protocol with both data and control flows, such that the network interface controller communicates with a cloud server via the Ethernet interface.

Apparently, the network accessing function is implemented by the network interface card integrated in the PCIe storage device.

Eighth Embodiment

Figure 8:
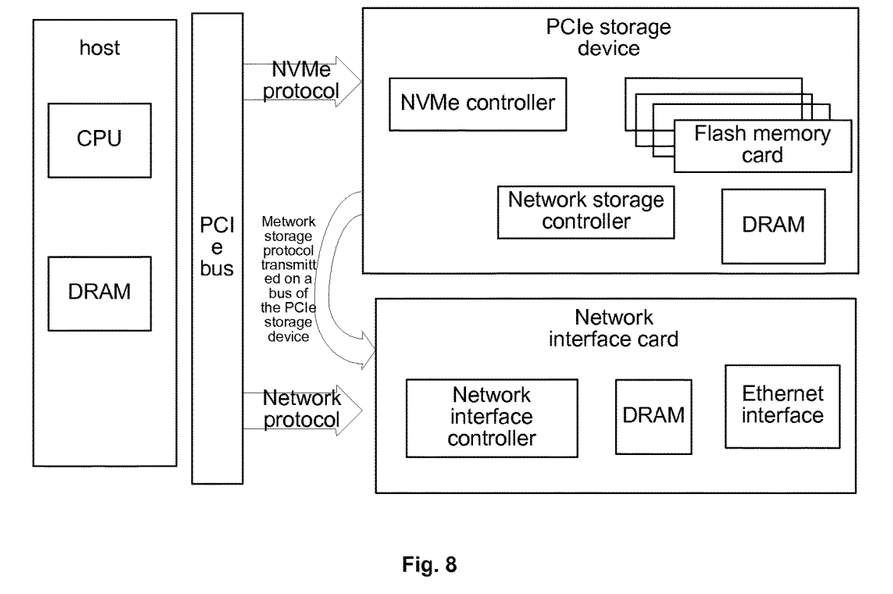
FIG. 8 is a second diagram of a hardware implementation of a PCIe storage device according to an embodiment of the disclosure.

FIG. 8 is a second diagram of a hardware implementation of a PCIe storage device according to the embodiment of the disclosure. The PCIe storage device has a network accessing function and a local storage function. As shown in FIG. 8, the PCIe storage device mainly comprises: an NVMe controller, a network storage controller, a plurality of Flash Memories and a DRAM.

An external network interface card mainly comprises: a network interface controller, a DRAM and an Ethernet interface. The Ethernet interface may be at a speed level of thousands/ten thousands of Mbps.

The network accessing function of the PCIe storage device may be implemented in the following manner.

The PCIe storage device makes a data access request to the network interface card by transmitting a network storage protocol with both data and control flows over a PCIe bus, in order to communicate with a cloud server through the network interface card.

Apparently, the network accessing function of the PCIe storage device in the embodiment is implemented by the PCIe storage device initiating network data accessing to the network interface card over the PCIe bus.

It shall be appreciated that the methods, apparatus and electronic devices disclosed by the embodiments given here can be implemented in other manners. The above described device embodiments are just illustrative. For example, the division of the device into units is just made in terms of their logical functioning. In practical implementation, there may be other manners for dividing the device. For example, multiple units or components may be combined or may be integrated into another system, or some features may be omitted or not implemented. In addition, direct couplings or communication connections as illustrated or discussed may be via some interfaces, and indirect couplings or communication connections between devices or units may be electrical, mechanical or in other forms.

Units described above as separate components may or may not be physically separate. A component illustrated as a unit may or may not be a physical unit. That is, it may be located in one place or distributed over multiple network units. The object of the embodiment solution may be achieved by selecting some or all of the units according to practical demands.

Additionally, the functional units in the embodiments of the disclosure may be integrated into one processing module or implemented as separate units, or two or more of them may be integrated into one unit. The integrated unit may be implemented in hardware or in the form of hardware plus software functional units.

As those skilled in the art will appreciate, all or some of the steps of the above method embodiments may be implemented in hardware related to program instructions. The program may be stored in a computer-readable medium. When the program is executed, the steps of the above method embodiments are performed. The medium includes any kind of medium that can store program codes, such as a removable storage device, a read-only memory (ROM), a random access memory (RAM), a disk or an optical disc.

Alternatively, when the above-described integrated unit according to embodiments of the disclosure is implemented in the form of software functional units and is sold and used as a single product, it can be stored in a computer readable storage medium. Based on such understanding, technical solutions according to the disclosure in essence (in other words, the part of the technical solutions which contributes to the prior art) can be embodied in the form of a software product. The computer software product is stored in a storage medium and includes several instructions which cause a computer device (which may be a personal computer, a server, or a network device, etc.) to implement all or some of the steps of the methods according to the embodiments of the disclosure. The above-mentioned storage medium includes any kind of medium which can store program codes, such as a removable storage device, a ROM, a RAM, a magnetic disk or an optical disc, etc.

The above contents are just detailed embodiments of the disclosure and are not intended to limit the disclosure. Any alterations or replacements that can be readily conceived of by those skilled in the art within the spirit and scope of the disclosure shall be encompassed by the protection scope of the disclosure. Thus, the protection scope of the disclosure is intended to be defined by the appended claims.

What is claimed is:

1. A data accessing method applied to a PCIe storage device, the method comprising:
   receiving a data reading/writing request sent by a host;
   calculating a physical storage location of data to be accessed, based on the data reading/writing request; and
   acquiring data from one of a plurality of PCIe storage devices based on the network protocol according to the physical storage location of data to be accessed and transferring the data to the host;
   wherein when the physical storage location of data to be accessed is a cloud storage server,
   transmitting a network storage protocol request to the one of the plurality of PCIe storage devices, wherein the plurality of PCIe storage devices communicate according to the network protocol and
   transferring data returned by the cloud storage server to a dynamic random access memory (DRAM) of the host,
   or when the physical storage location of data to be accessed is a local storage,
   transmitting to the host a response to a PCIe-based storage protocol command;
   transferring the data to be accessed in the local storage to a DRAM in the host.

2. The method of claim 1, wherein the plurality of PCIe storage devices can communicate directly and share the same storage resources.

3. The method of claim 1, further comprising: before receiving the data reading/writing request sent by the host, logically mapping hard disk storage space to a storage device, such that a uniform hard disk file operation interface is presented on an operating system of the host.

4. The method of claim 1, wherein
   said transmitting the network storage protocol request to the cloud storage server comprises: transmitting the network storage protocol request to the cloud storage server through an external network interface card; and
   said transferring the data returned by the cloud storage server to the DRAM of the host comprises: configuring a direct memory access (DMA) controller in the external network interface card to transfer the data returned by the cloud storage server to the DRAM of the host, or
   said transmitting the network storage protocol request to the cloud storage server comprises: transmitting the network storage protocol request to the cloud storage server through a network interface card integrated in the PCIe storage device; and
   said transferring the data returned by the cloud storage server to the DRAM of the host comprises: configuring a DMA controller in the PCIe storage device to transfer the data returned by the cloud storage server to the DRAM of the host.

5. The method of claim 1, wherein said acquiring the data from the plurality of PCIe storage devices based on the network protocol and transferring the data to the host further comprises:
   when the data to be accessed is stored in a distributed cache of a private cloud server, acquiring the data to be accessed by accessing storage resources on other hosts, which have PCIe storage devices arranged thereon, based on a point-to-point data transport protocol instead of accessing the private cloud server.

6. A PCIe storage device, comprising:
   a bus interface configured to receive a data reading/writing request sent by a host;
   a first controller configured to receive the data reading/writing request from the bus interface and calculate a physical storage location of data to be accessed based on the data reading/writing request;
   a second controller configured to acquire data from one of a plurality of PCIe storage devices based on a network protocol according to the physical storage location of data to be accessed and transfer the data to the host;
   wherein the second controller comprises a network storage controller configured to transmit a network storage protocol request to the one of the plurality of PCIe storage devices when the physical storage location of data to be accessed is the cloud storage server, wherein the plurality of PCIe storage devices communicate according to the network protocol by the network storage controller, and to transfer data returned by the cloud storage server to a DRAM of the host, and
   an NVMe controller configured to transmit to the host a response to a PCIe-based storage protocol data command when the physical storage location of data to be accessed is a local storage and to transfer the data to be accessed in the local storage to a DRAM of the host.

7. The PCIe storage device of claim 6, wherein the plurality of PCIe storage devices can communicate directly and share the same storage resources.

8. The PCIe storage device of claim 6, wherein the PCIe storage device further comprises:
   a mapping driver configured to logically map hard disk storage space to a storage device, such that a uniform hard disk file operation interface is provided on an operating system of the host.

9. The PCIe storage device of claim 6, wherein the network storage controller is further configured to:
   transmit the network storage protocol request to the cloud storage server through the external network interface card, and configure a DMA controller in the network interface card to transfer the data returned by the cloud storage server to the DRAM of the host, wherein the network interface card is connected to the PCIe storage device, or transmit the network storage protocol request to the cloud storage server through a network interface card integrated in the PCIe storage device, and configure a DMA controller in the PCIe storage device to transfer the data returned by the cloud storage server to the DRAM of the host.

10. The PCIe storage card of claim 6, wherein the network storage controller is further configured to:

when the data to be accessed is stored in a distributed cache of a private cloud server, acquire the data to be accessed by accessing storage resources on other hosts, which have PCIe storage devices arranged thereon, based on a point-to-point data transport protocol instead of accessing the private cloud server.

\* \* \* \* \*